United States Patent

Newman

Patent Number: 5,730,082
Date of Patent: Mar. 24, 1998

[54] INSECT RESISTANT PET DISH WITH AUTOMATIC WATER LEVEL MAINTENANCE

[76] Inventor: John Anthony Newman, 33-934 Palm Lake Cir., Thousand Palms, Calif. 92276

[21] Appl. No.: 658,986

[22] Filed: Jun. 4, 1996

[51] Int. Cl.[6] .................... A01K 5/00; A01K 7/00
[52] U.S. Cl. ................................ 119/51.5; 119/77
[58] Field of Search ................ 119/51.5, 61, 77, 119/78

[56] References Cited

U.S. PATENT DOCUMENTS

| | | | |
|---|---|---|---|
| D. 326,742 | 6/1992 | Tart | D30/130 |
| D. 346,465 | 4/1994 | Russell et al. | D30/130 |
| D. 365,668 | 12/1995 | Lorenzana et al. | D30/130 |
| 2,191,811 | 2/1940 | Trampier, Sr. | 119/51.5 |
| 2,543,465 | 2/1951 | Morey | 119/51.5 |
| 4,134,365 | 1/1979 | Futers et al. | 119/51.5 |
| 4,357,905 | 11/1982 | Carpenter | 119/61 |
| 5,069,166 | 12/1991 | Ahuna | 119/61 |
| 5,245,948 | 9/1993 | McClellan | 119/51.5 |
| 5,259,336 | 11/1993 | Clark | 119/51.5 |
| 5,423,291 | 6/1995 | Daugherty | 119/77 |
| 5,577,461 | 11/1996 | Sebastian et al. | 119/61 X |

*Primary Examiner*—Robert P. Swiatek
*Assistant Examiner*—Yvonne R. Abbott
*Attorney, Agent, or Firm*—Gene Scott -Patent Law & Venture Group

[57] ABSTRACT

A pet feeder provides a food dish surrounded by a water moat which flows in common with an open watering portion of the pet feeder. A separate portion of the feeder provides a water storage bottle held in the inverted orientation so as to replenish water in the feeder automatically. A float controlled water inlet may also be used to maintain water level.

6 Claims, 1 Drawing Sheet

U.S. Patent  Mar. 24, 1998  5,730,082
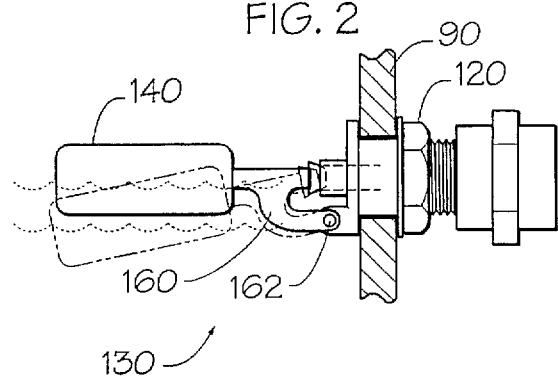
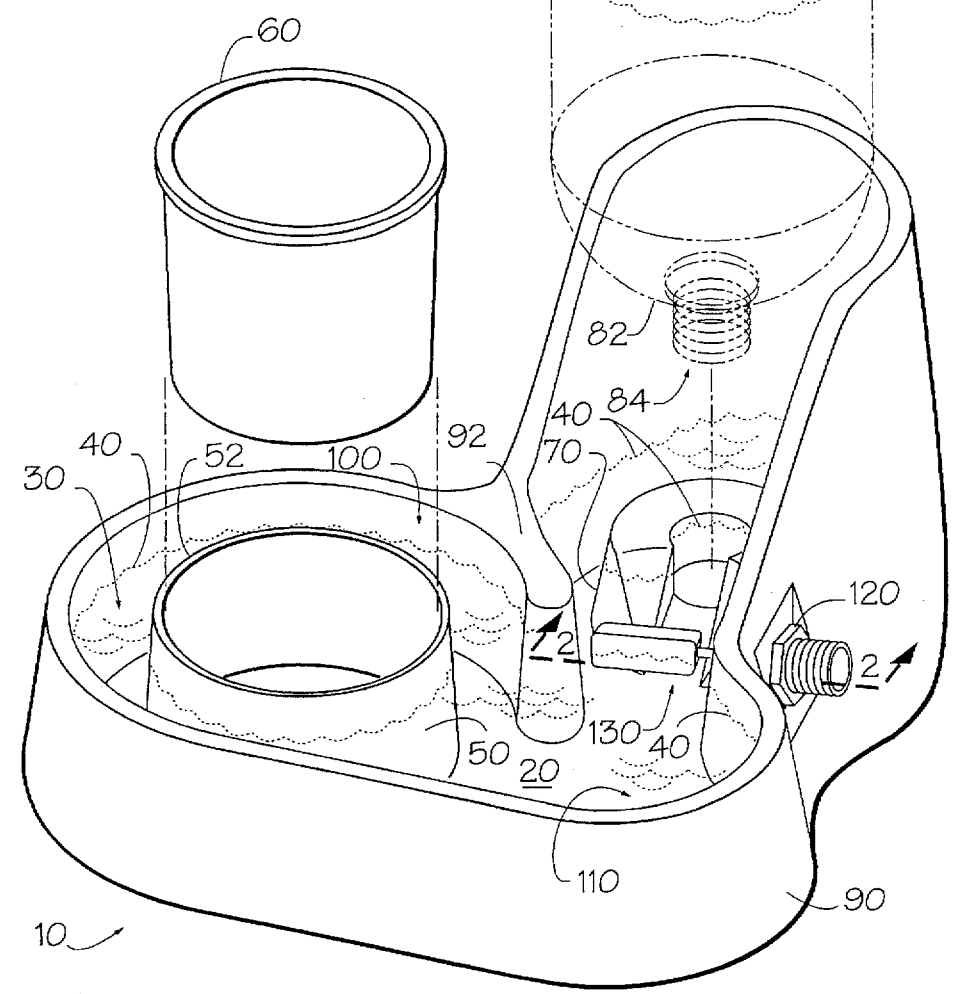

INSECT RESISTANT PET DISH WITH AUTOMATIC WATER LEVEL MAINTENANCE

BACKGROUND OF THE INVENTION

1. Field of the Invention

This invention relates generally to pet feeding dishes, and more particularly to a dish providing resistance to insect ingress and also liquid level control.

2. Description of Related Art

Invention and use of devices in the field of the invention is known to the public, as they are used for the intended purposes as defined herein. The following art defines the state of this field at this time:

Ahuna, U.S. Pat. No. 5,069,166 shows an animal dish which includes a moat, sized and adapted to be filled with water, to inhibit crawling insects having access to food or drink in the dish. The dish is made to inhibit food or drink from the dish from passing into and contaminating the water in the moat.

Carpenter, U.S. Pat. No. 4,357,905 shows a pet feeder combining a food bowl and a water bowl. The food bowl is surrounded by a moat cavity which fills with water flowing through a horizontal passage, connecting the moat cavity with the water bowl to form a moat so insects will not cross to gain access to the food in the food bowl.

McMlellan, U.S. Pat. No. 5,245,948 shows an animal feeder with a moat surrounding the food section, therefore preventing contamination from insects. A water supply section is affixed onto the outer periphery of the moat, sometimes being a part of the moat with the water supply section being more shallow than the moat so that the animal can drink all of the water in the water supply section, while leaving water in the moat.

Trampier, Sr., U.S. Pat. No. 2,191,811 shows a food and water dish for animals that is made up of a bowl, a trough surrounding the lower portion of the bowl, a partition horizontally through the bowl, which divides the bowl into food and water compartments, and a conduit extending vertically through the wall of the bowl with its lower portion extending downward from the inside of the bowl and into the trough, the upper portion of the conduit projecting up from the wall along side of the partition with its top end terminating in down spaced relation to the upper edge of the partition, so water may accumulate in the water compartment to a certain depth and overflow through the conduit and fill the trough.

Tart, U.S. Des. Pat. No. 326,742 describes a two compartment food dish that is surrounded by a moat.

Russell et at., U.S. Des. Pat. No. 346,465 describes a two compartment food dish where the food compartment is enclosed on three sides by a larger compartment, to hold water.

Futers et at., U.S. Pat. No. 4,134,365 describes a feeding apparatus, which operates to provide a constant supply of food and drink. The food is supplied to the food dish by a hopper, and the liquid from a container with a special cap into a reservoir, which is in communication with the drinking vessel. The liquid container mounts into clips formed integrally with the hopper, and the cap includes a pivotally mounted flap arranged so the flap can be opened when the liquid container is inserted into the slips and the cap is pressed down into the reservoir.

Clark, U.S. Pat. No. 5,259,336, teaches a combined automatic pet waterer and feeder.

Lorenzana et at, Des. U.S. Pat. No. 365,668, teaches a design for an inverted bottle pet dish.

Clark, Futers et al and Lorenzana et al each teach the use of an inverted water storage bottle for automatic water level control in a watering portion of the animal feeder. However, they do not teach a moat for protecting the feed portion of the feeder. Carpenter, Russell et al and McClellan all teach the use of a water moat for preventing insects from reaching the feed portion of the feeder, and that this moat can be common with the watering section of the feeder, but none teach the use of an inverted bottle or other means for controlling the water level in such a feeder. The prior art does not teach a pet dish having water level control of both a moat around a food dish, and a drinking area of the pet dish. The present invention fulfills these needs and provides further related advantages as described in the following summary.

SUMMARY OF THE INVENTION

The present invention teaches certain benefits in construction and use which give rise to the objectives described below. The invention is a pet dish providing a moat construction around a food dish, an open space drinking area and a water level control area. The water level in the pet dish is controlled at a desired level by automatic water replenishment for water lost through evaporation and animal feeding. Automatic level control is accomplished through the use of an inverted and partially submerged water storage bottle held within the pet dish. Alternately, the level control may be accomplished by the use of a float valve attached to a hose bib water inlet. Thus it is an objective of the present invention to provide a food dish surrounded by a water moat in order to prevent crawling insects from reaching and contaminating the food. It is another objective to provide an open surface within the dish for animal drinking. It is a further objective to provide automatic water level control within the pet dish, this control acting for both the moat around the food dish, as well as the drinking area of the dish. It is a still further object of the invention to provide a portion of a peripheral wall of the pet dish for surrounding the water bottle in order to maintain the bottle in the inverted attitude.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a device for feeding pets. In such drawings:

FIG. 1 is a perspective view of the preferred embodiment of the present invention a pet feeding dish; and FIG. 2 is a cross-sectional view thereof taken along line 2—2 of FIG. 1, particularly showing a means for automatically maintaining a water level in the dish.

DETAILED DESCRIPTION OF THE PREFERRED EMBODIMENT

The above described drawing figures illustrate a manufacture for feeding pets. The manufacture is a pet dish 10 providing a horizontally oriented upfacing surface 20 for supporting water 30 at a water level 40 in the pet dish 10. A supporting wall 50 extends upwardly from the upfacing surface 20, and encloses a food dish 60. The food dish 60 preferably removably rests upon a lip 52 of the supporting wall 50. A horizontal platform 70 rests upon the upfacing surface 20, and is positioned for supporting a shoulder 82 of an inverted water bottle 80 so that a discharge opening 84 of the water bottle 80 is positioned above the upfacing surface 20. A peripheral wall 90 is positioned and oriented to encircle the upfacing surface 20 so that the water 30 is restrained on it, i.e., within the pet dish 10. A portion of the peripheral wall 90 is positioned around the water bottle 80 in order to constrain it to its preferred inverted orientation. A portion of the peripheral wall 90 defines an annular space 100 between the dish supporting wall 50 and the peripheral wall 90, functionally a moat surrounding the food dish 60. Finally, the peripheral wall establishes an open space drinking area 110 above the upfacing surface 20. This area 110 is of a size for accommodating the snout of a dog (not shown). An interior partition wall 92 is contiguous with the peripheral wall 90 and extends the peripheral wall 90 further around the supporting wall 50 further defining the annular space 100. This partition wall 92 is further positioned to aid in supporting the bottle 80 in the inverted orientation.

The annular space 100, the horizontal platform 70, and the open space drinking area 110 all mutually communicate to maintain the water level 40, which is common to all three of these elements. This level 40 is automatically maintained because the discharge opening 84 of the bottle 80 is elevated above the surface 20 because of the relationship between the platform 70 and the shoulder 82 of the bottle. When the water level 40 in the pet dish 10 tends to drop below the discharge opening 84, water flows from the bottle 80 into the dish 10 automatically maintaining the water level 40 at the level of the discharge opening 84 of the water bottle 80.

The pet dish 10 may also include a means for water inlet 120 through the peripheral wall 90. This inlet means is preferably a hose bib with facility for attaching a hose to the exterior portion. Water may be forced through the hose bib and into the pet dish 10 for filling it or for raising the level 40. A means for automatic water level control 130 may be included with the inlet means 120. Such a level control 130 could be a float mechanism as shown in FIG. 2. In this embodiment, the level control 130 includes a float 140, a stopper 150 attached to the float 140, and a pivot means 160. As the water level 40 rises from water flowing into the pet dish 10 through the inlet means 120, the float 140 moves upwardly as it maintains its position floating on the surface of the water 30. As the float 140 rises, the pivot means 160 rotates about pivot pin 162 driving stopper 150 into inlet means 120. Water flow is continuously diminished until it is completely stopped. As the water level 40 drops from evaporation and from animal feeding, stopper 150 tends to move out of inlet means 120 thereby permitting further inflow of water 30 so that the desired water level 40 is maintained automatically.

The pet dish may be adapted with the platform 70 for bottled water replenishment of the water level 40, or with a float control 130, or with both.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A manufacture for feeding pets, comprising:

a pet dish providing a horizontally oriented upfacing surface for supporting water at a water level in the pet dish; and extending upwardly from the upfacing surface, a supporting wall enclosing a food dish;

and resting upon the upfacing surface, a horizontal platform positioned for supporting a shoulder of an inverted water bottle so that a discharge opening of the water bottle is positioned above the upfacing surface; and a peripheral wall positioned and oriented for: (a) encircling the upfacing surface so that the water is restrained thereon, (b) constraining the water bottle to an inverted orientation, (c) forming an annular space between the dish supporting wall and the peripheral wall, and, (d) establishing an open space drinking area above the upfacing surface of a size for accommodating the snout of a dog;

the annular space, the horizontal platform, and the open space drinking area, all mutually communicating to maintain common thereto, the water level as automatically maintained at the level of the discharge opening of the water bottle.

2. The manufacture of claim 1 wherein the food dish is removably resting upon a lip of the supporting wall.

3. The manufacture of claim 1 further including a means for water inlet through the peripheral wall for filling the pet dish.

4. The manufacture of claim 3 wherein the water inlet means includes a means for water level control.

5. The manufacture of claim 1 further including an interior partition wall contiguous with the peripheral wall, the interior partition defining a continuation of the annular space between the dish supporting wall and the peripheral wall, and further constraining the bottle to the inverted orientation.

6. The manufacture of claim 1 wherein that portion of the peripheral wall adjacent to the bottle, is formed to a superior height as necessary to shelter the bottle.

\* \* \* \* \*